US012784777B2

(12) United States Patent
Bonnie et al.

(10) Patent No.: US 12,784,777 B2
(45) Date of Patent: Nov. 3, 2026

(54) METHODS FOR DUBBING AUDIO-VIDEO MEDIA FILES

(71) Applicant: Pylon AI, Inc., Chattanooga, TN (US)

(72) Inventors: Shelby Bonnie, San Francisco, CA (US); William Rice, Chattanooga, TN (US); Joshua Ziegler, Ooltewah, TN (US); Noel Weichbrodt, Chattanooga, TN (US); Timothy Willison, Chattanooga, TN (US); Elizabeth Ropp, Boulder, CO (US); Josephine Courant, Mill Valley, CA (US)

(73) Assignee: Noel Weichbrodt, Chattanooga, TN (US)

( * ) Notice: Subject to any disclaimer, the term of this patent is extended or adjusted under 35 U.S.C. 154(b) by 293 days.

(21) Appl. No.: 18/320,129

(22) Filed: May 18, 2023

(65) Prior Publication Data

US 2023/0377607 A1 Nov. 23, 2023

Related U.S. Application Data

(60) Provisional application No. 63/364,961, filed on May 19, 2022.

(51) Int. Cl.
*G11B 27/031* (2006.01)
*G10L 13/033* (2013.01)
(Continued)

(52) U.S. Cl.
CPC ........ *G11B 27/031* (2013.01); *G10L 13/0335* (2013.01); *G10L 13/04* (2013.01);
(Continued)

(58) Field of Classification Search
CPC ... G11B 27/031; G11B 27/10; G10L 13/0335; G10L 13/04; G10L 13/10; G10L 15/26; G10L 13/033; G10L 13/02
See application file for complete search history.

(56) References Cited

U.S. PATENT DOCUMENTS

| | | | | |
|---|---|---|---|---|
| 10,930,263 | B1 * | 2/2021 | Mahyar | G10L 15/16 |
| 11,238,843 | B2 * | 2/2022 | Arik | G10L 13/08 |

(Continued)

OTHER PUBLICATIONS

Written Opinion of the International Preliminary Examining Authority mailed Apr. 4, 2024, from the IPEA/European Patent Office, for International Patent Application No. PCT/US2023/022786 (filed May 18, 2023), 6 pgs.

(Continued)

*Primary Examiner* — Bhavesh M Mehta
*Assistant Examiner* — Jangwoen Lee
(74) *Attorney, Agent, or Firm* — Midtown Intellectual Property, PC; C A Schlecht

(57) ABSTRACT

Methods and systems for dubbing audio-video media productions. Dubbed audio-video media production are produced by training a learning engine to produce synthesized audio representing speech using audio samples provided by speakers with a variety of vocal characteristics and/or to modify pre-recorded speech. Synthesized audio produced by a trained instance of the learning engine is applied to produce a soundtrack for the audio-video media production in which characters depicted therein have specified speaker vocal characteristics. This may be done by generating, line-by-line, utterances for each respective one of the characters according to a script for the audio-video media production and in a voice reflecting those of the respective vocal characteristics of a one of the speakers corresponding to the respective one of the characters. Playback of the utterances is synchronized with video elements of the audio-video media production, as specified, for example, through a timeline editor of a user interface.

20 Claims, 15 Drawing Sheets

(51) Int. Cl.

| | |
|---|---|
| ***G10L 13/04*** | (2013.01) |
| ***G10L 13/10*** | (2013.01) |
| ***G10L 15/26*** | (2006.01) |
| ***G11B 27/10*** | (2006.01) |

(52) U.S. Cl.

CPC .............. *G10L 13/10* (2013.01); *G10L 15/26* (2013.01); *G11B 27/10* (2013.01)

(56) References Cited

U.S. PATENT DOCUMENTS

| | | | | |
|---|---|---|---|---|
| 11,551,664 | B2 * | 1/2023 | Gupta | G06V 40/171 |
| 11,929,099 | B2 * | 3/2024 | Allibhai | G11B 27/34 |
| 2005/0042591 | A1 * | 2/2005 | Bloom | G11B 27/34 434/308 |
| 2020/0213680 | A1 * | 7/2020 | Ingel | H04N 21/8106 |
| 2021/0352380 | A1 * | 11/2021 | Duncan | H04N 21/4884 |
| 2022/0406292 | A1 * | 12/2022 | Bratt | G06F 40/117 |
| 2023/0039248 | A1 * | 2/2023 | McCartney | G10L 13/02 |
| 2023/0125170 | A1 | 4/2023 | Sanders et al. | |
| 2023/0260502 | A1 * | 8/2023 | Gabrys | G06N 3/045 704/260 |

OTHER PUBLICATIONS

Luo, Y. and Mesgarani, N., "Conv-TasNet: Surpassing Ideal Time-frequency Magnitude masking for Speech Separation," IEEE/ACM Trans. On Audio, Speech, and Language Processing, v. 27, No. 8, pp. 1256-1266 (Aug. 2019).

Subakan, C. et al., "Attention Is All You Need In Speech Separation," ICASSP 2021—2021 IEEE International Conference on Acoustics, Speech and Signal Processing (ICASSP), Toronto, ON, Canada, 2021, pp. 21-25.

International Search Report and Written Opinion mailed Jul. 26, 2023, from the ISA/European Patent Office, for International Patent Application No. PCT/US2023/022786 (filed May 18, 2023), 15 pgs.

Soens; et al., "On split Dynamic Time Warping for robust Automatic Dialogue Replacement", Signal Processing (2012), 92:439-454.

* cited by examiner

METHODS FOR DUBBING AUDIO-VIDEO MEDIA FILES

This is a NONPROVISIONAL of, claims priority to, and incorporates by reference U.S. Provisional Application 63/364,961, filed May 19, 2022.

FIELD OF THE INVENTION

The present invention relates to methods for dubbing audio-video media files and, in particular, to such methods as may be used to provide a dubbed audio-video media production using synthetically generated audio content customized according to user-specified traits and characteristics.

BACKGROUND

Dubbing, sometimes known as mixing, is generally understood as a process used in audio-video media production in which additional or supplementary audio information is added to an original production's soundtrack, and synchronized (e.g., lip-synced, where necessary) with the original production's video content to create a final soundtrack. As such, dubbing is commonly used to provide replacement or alternate soundtracks for an audio-video media production to accommodate a variety of requirements, including content localization.

Historically, dubbing has been a manually intensive process, relying upon human transcribers to create transcriptions of an audio-video media production, human translators to translate the audio-video media production transcription into various languages, and human voice actors to provide spoken recitations of the transcriptions in those various languages for recording and addition to the audio-video media production. More recently, machine-based processes have been used to supplement or replace humans in some or all of these procedures. For example, U.S. Pat. No. 10,930,263 describes automated techniques for replicating characteristics of human voices across different languages. And, US PGPUB 2021/0352380 describes a computer-implemented method for transforming audio-video data that includes converting extracted recorded audio from the audio-video data into text data, generating a dubbing list that includes the text data and timecode information correlating the audio to frames of the audio-video data, assigning annotations to vocal instances in the audio data that specify one or more creative intents, and other operations.

SUMMARY

The present invention provides techniques for dubbing audio-video media productions. In one embodiment, a dubbed audio-video media production is produced by training a learning engine to produce synthesized audio representing speech using audio samples provided by speakers with a variety of vocal characteristics and/or to modify pre-recorded speech according to such vocal characteristics; and applying synthesized audio produced by a trained instance of the learning engine to produce a soundtrack for the audio-video media production in which characters depicted in the audio-video media production have specified speaker vocal characteristics by generating, line-by-line, utterances for each respective one of said characters according to a script for the audio-video media production and in a voice reflecting those of the respective vocal characteristics of one of the speakers corresponding to the respective one of the characters, and synchronizing playback of the utterances with video elements of the audio-video media production. In some cases, the utterances may be intermixed with pre-recorded sounds or speech, which can be modified using the trained learning engine to produce vocal effects and characteristics.

The audio samples provided by the speakers may be recorded instances of readings of a provided script; for example, readings that reflect the speakers emulating a variety of emotional characteristics. In some cases, the readings may reflect the speakers reading the provided script in one or more of: their respective normal voice; in raised voice; in sotto voce; and in various emotional states, such as admiration, adoration, aesthetic appreciation, amusement, anger, anxiety, awe, awkwardness, boredom, calmness, confusion, craving, disgust, empathic pain, entrancement, excitement, fear, horror, interest, joy, nostalgia, relief, romance, sadness, satisfaction, sexual desire, and/or surprise.

The utterances for each respective one of the characters are adaptations of the synthesized audio produced by the trained instance of the learning engine with applied linguistic and/or audio effects. Such linguistic effects may include modifications to pronunciations and/or modifications of word order in a sentence. The audio effects may include one or more of low pass filtering, high pass filtering, bandpass filtering, cross-synthesis, and convolution. And, the vocal characteristics may include one or more of volume, pitch, pace, speaking cadence, resonance, timbre, accent, prosody, and intonation.

The script for the audio-video media production may be transcribed from audio data extracted from a pre-dub instance of the audio-video media production, or it may be something the user creates independently of any pre-dub instance of the audio-video media production. In some cases, the script for the audio-video media production is encoded to include information about times at which audio data in the pre-dub instance of the audio-video media production is included relative to video data in the pre-dub instance of the audio-video media production. And, in addition to the audio data being extracted from the pre-dub instance of the audio-video media production, metadata may be extracted from the pre-dub instance of the audio-video media production through the use of components for one or more of: audio analysis, facial expression, age/sex analysis, action/gesture/posture analysis, mood analysis, and perspective analysis. This metadata may be used to apply linguistic and/or audio effects so that the utterances for each respective one of the characters are adaptations of the synthesized audio produced by the trained instance of the learning engine according to an emotional tone of a scene or state of a character of the pre-dub instance of the audio-video media production.

As discussed further below, the script for the audio-video media production may be transformed into a corresponding phonetic pronunciation and the linguistic and/or audio effects applied, as appropriate, to textual or phonetic representations of the script for the audio-video media production to produce the utterances. And, as will be detailed through reference to various illustrations, the synthesized audio produced by a trained instance of the learning engine may be applied to produce the soundtrack for the audio-video media production according to user-specified prompts indicated in a timeline editor. Such prompts may include text to be spoken by the characters according to assigned diction and/or signal effects.

As will become apparent from the description provided herein, the script for the audio-video media production is used as an input to the trained instance of the learning engine to produce the soundtrack for the audio-video media production in which the utterances for each respective one of the characters are played in the voice reflecting those of the respective vocal characteristics of a one of the speakers corresponding to the respective one of the characters. The vocal characteristics for the characters may be selected through a graphical user interface that allows for specification of same as well as one or more of: diction effects, audio effects, and signal processing effects.

These and further embodiments of the invention are discussed in greater detail below.

BRIEF DESCRIPTION OF THE DRAWINGS

The present invention is illustrated by way of example, and not limitation, in the figures of the accompanying drawings, in which.

DETAILED DESCRIPTION

Figure 1:
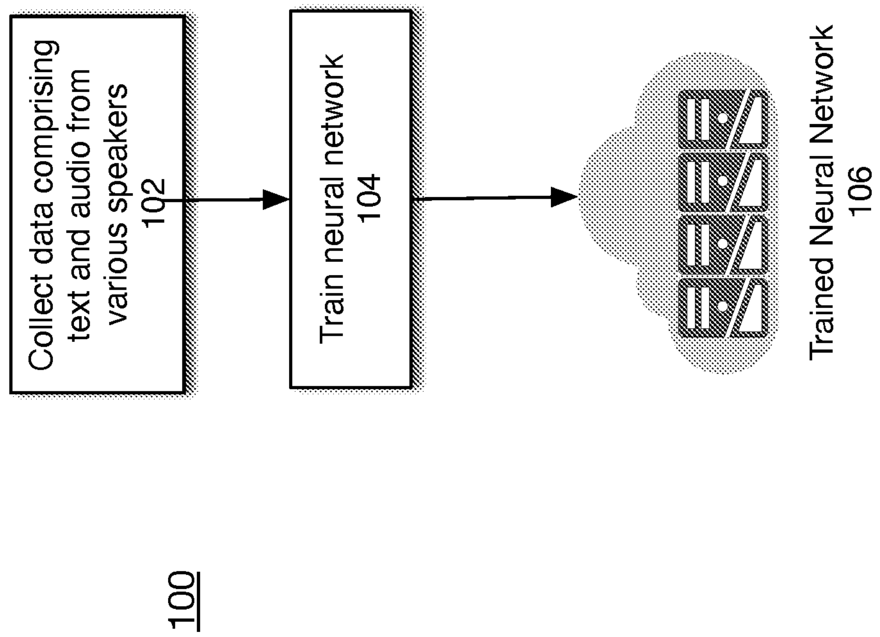
FIG. 1 illustrates an example of training a learning engine, in particular a neural network, with voice samples, in accordance with an embodiment of the present invention.

The present invention provides techniques for dubbing audio-video media productions and makes use of a stored library of audio samples from speakers with a variety of vocal characteristics. The audio samples are used to train a learning engine, e.g., a neural network, to generate sounds according to desired vocal characteristics, which sounds can be used to produce a soundtrack for an audio-video media production. In addition to the soundtrack having desired speaker vocal characteristics, linguistic and/or audio effects may also be applied in order to produce speaker vocal customizations of a desired nature and quality. This allows users to customize their audio-video media productions for comedic or other effect.

In one embodiment of the invention, the library of audio samples is collected by recording speakers having a variety of different accents, speakers of different ages and genders, and speakers emulating a variety of emotional characteristics. For example, speakers may be provided a script and recordings may be made of the speakers reading the script in their respective normal voice; in raised voice; in sotto voce; in various emotional states, e.g., admiration, adoration, aesthetic appreciation, amusement, anger, anxiety, awe, awkwardness, boredom, calmness, confusion, craving, disgust, empathic pain, entrancement, excitement, fear, horror, interest, joy, nostalgia, relief, romance, sadness, satisfaction, sexual desire, and surprise; and in other manners.

The library of recorded audio samples is used to train a learning engine, such as a neural network. In particular, the learning engine is trained to produce sounds from a text input according to a desired vocal characteristic. Vocal characteristics include volume (loudness), pitch, pace, pauses (periods of silence), resonance (timbre), accent, prosody, and intonation. The trained model is able to produce, for a given text input, an output that reproduces the text in a spoken voice that has desired qualities. Additionally, the trained model is configured to apply linguistic and audio effects as desired. Linguistic effects, or diction effects, represent such things as modifications to pronunciations (e.g., British pronunciations vs. American pronunciations of the same word), and modifications of word order in a sentence. For example, rather than reproducing a sentence in a subject-verb-object fashion, a customization may be provided to produce the sound output in an object-subject-verb manner (e.g., rather than “She killed the spider.”, “The spider, she killed.”), etc. Audio effects, or signal effects, represent customizations such as low/high/bandpass filtering and cross-synthesis/convolution. One benefit provided by such linguistic and audio customizations is that it allows a user to introduce novelty effects for an audio-video media production soundtrack. Not only can a speaker be given a “voice” for the soundtrack, the speaker can also be provided with desired style of speech.

With the trained model available, it can be used to create dubs for an audio-video media production. To that end, in various embodiments of the invention, an audio-video media production, such as an audio-video clip recorded by a smart phone or other device, is automatically transcribed to extract spoken words from the audio signal. The transcription may be encoded to include information about the time at which the audio data is included relative to the video data. In addition, various metadata may be included, such as speaker emotion, speaker accent, etc. The aforementioned US PGPUB 2021/0352380 describes one method for extracting such metadata. Briefly, it is accomplished through the use of components for audio analysis, facial expression, age/sex analysis, action/gesture/posture analysis, mood analysis, and perspective analysis, which components cooperate to provide an indication of an emotional tone of a scene or state of a character in a scene of an audio-video media production that is being analyzed.

The transcript of the audio-video media production or, alternatively, a script for such a production may then be transformed into a corresponding phonetic pronunciation. In some instances, a user may desire to create an audio soundtrack where no previously recorded audio data exists. For example, a user may be provided one or more template-like animations, video clips, and/or other video data for the user to create his/her/their own audio soundtrack to be applied to the template. The user may further provide a script for the production or make use of and/or edit a previously produced script and arrange same along with the voiceover profiles and any selected audio and/or linguistic effects, for example using a timeline editor. When so arranged, the script may then be "read" by the animated characters and/or presented visually as subtitles in synchronization with frames of the video data as specified by the user. The present invention thus provides a means for producing an audio soundtrack for such templates, video clips, etc.

In one embodiment, the transcript or script may be annotated to include locations for diction and/or signal effects of the kind noted above to be applied and the annotated transcript or script transformed into a machine-readable markup language version thereof. This machine-readable version of the annotated transcript or script may be used to assign pronunciations according to a rules engine for textual expressions. Additionally, signal processing effects may be applied to achieve desired characteristics. For example, the user may specify the manner in which the audio is to be rendered (e.g., fast, slow, angry, etc.). In this way, when the transcript or script is "read" by the characters, it is read so as to have the desired audio characteristics.

It is also worth noting that in some embodiments an existing script may be analyzed to determine various attributes of speakers within the script. For example, speaker attributes such as sentiment, appearance, and other characteristics may be uncovered through a review of the script and the script then annotated to include information (metadata) concerning those speaker attributes. The metadata so encoded or annotated may be used to automatically select one or more voices for an initial production of the script. For example, the metadata may be used to index a set of voice profiles and those voice profiles which most closely match (according to one or more criteria) selected metadata for each character in the script may be selected as the initial voice profiles to use for a production of the script. The automated selections can be revised by a user, if desired. And, changes to the script may result in changes to the character metadata, which would result in updated automated selections of voice profiles.

The phonetic version of the transcript or script, optionally along with the metadata extracted from the audio-video media production, is used as an input to the trained model to produce the new audio soundtrack having the desired vocal characteristics selected by the user. In one embodiment, such selections may be specified through a graphical user interface that allows for specification of desired vocal characteristics as well as diction and signal effects, augmented by any signal processing effects specified by the user. In other embodiments, or in addition, extracted metadata from the video clip may be used to assign one or more vocal characteristics for one or more characters in the clip. Additionally, extracted vocalizations from a clip may be augmented by specified or assigned vocal characteristics, or by signal processing effects specified by the user. For example, object recognition applied to the video clip (or frames thereof) may be used to identify and determine one or more objects present in a scene and vocal characteristics assigned to one or more characters in the scene accordingly; for example, if the scene is recognized as a Southern California beach with waves breaking the background, then one of the speakers in the scene may be assigned as a "beach dude" and provided corresponding vocal characteristics. Similarly, if a laptop computer is recognized in the scene, the laptop computer may be assigned vocal characteristics of a robot or similar automaton. We call these vocal characteristics "voices" for short. In general, a "voice" of a given speaker may be used so that various sounds of the speaker are produced in a manner to reflect the nature and character of that voice. For example, laughing, snorting, chuckling, screaming, crying, yawning, etc. all may have associated sounds and those sounds may be reproduced according to the vocal characteristics of the speaker through use of the trained model. Additionally, each of the above actions may have an associated emotional state, e.g., sad, happy, angry, frightened, in pain, etc., and so in addition to the sound being reproduced according to the vocal characteristics of the speaker, it may also be reproduced according to the speaker's associated emotional state, as reflected by the associated metadata that was extracted from the original audio-video media production or provided by the user as annotations to the script. Thus, for each "voice," that is for each character, a library of sounds may be produced for that voice so that the associated character may deliver lines of a script in an appropriate manner.

With the new audio soundtrack so produced, it may then be applied as a dub to the video data from the original audio-video media production or the selected animation, or video clip, etc. This may be done using a timeline editor to synchronize the audio soundtrack with frames of the video. Alternatively, where the extracted metadata from an original audio-video media production exists, that metadata may already include timecodes that facilitate the synchronization. Synchronization may include lip/mouth synchronization so that a speaker in the video portion of a production is seen to form words and/or sounds in harmonization with the audio portion of the production. Facial expressions associated with words and/or sounds may be recognized and the audio-video media production arranged so that the appropriate words and/or sounds are played to align in time with the visual presentation of the respective facial expressions. In the case of an animation, the characters of the animation may be presented with lip/mouth movements to correspond to words and/or sounds spoken by the characters.

Figure 11:
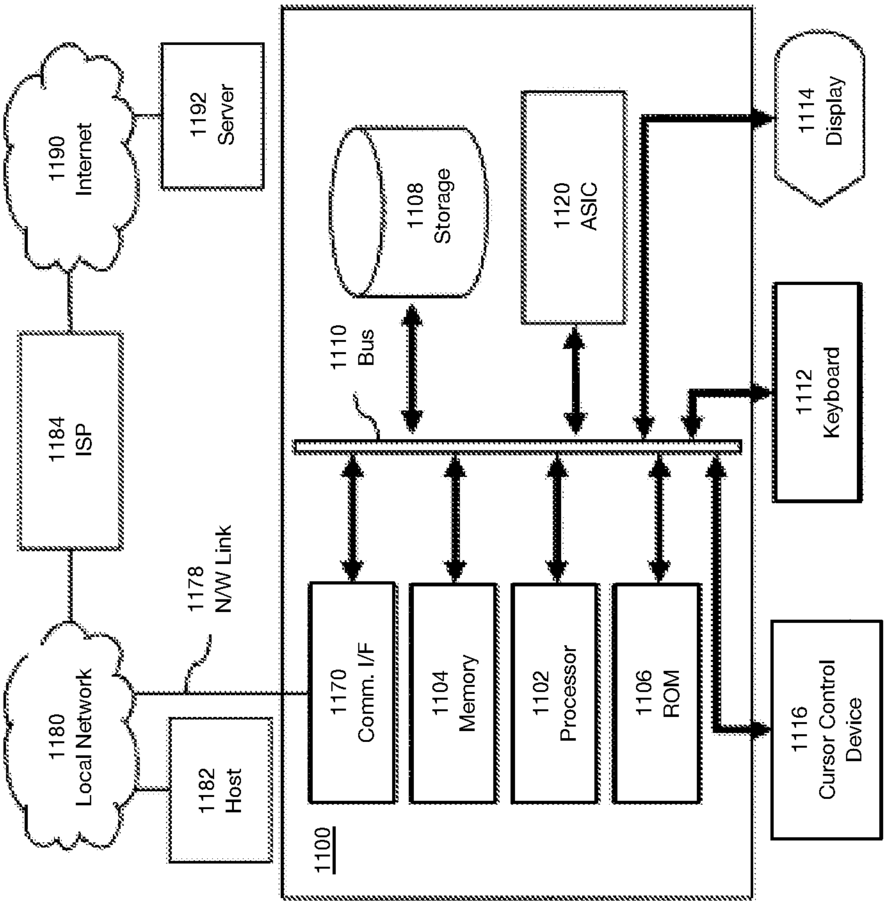
FIG. 11 illustrates an example of a computer network environment in which embodiments of the present invention may be deployed and used.

Before describing further details of the present invention, it is helpful to discuss an environment in which embodiments thereof may be deployed and used. FIG. 11 illustrates an example of such an environment. In this arrangement, a computer system 1100 is programmed via stored processor-executable instructions to interact with a server 1192, on which is hosted a service for dubbing audio-video media files and, in particular, for providing a dubbed audio-video media production using synthetically generated audio content customized according to user-specified traits and characteristics, in accordance with the present invention. In one embodiment, computer system 1100 acts as a client to server 1192 and is programmed to allow a user to construct and/or customize a dubbed audio-video media production, which may be downloaded to computer system 1100 and/or shared via one or more channels (e.g., social media channels, e-mail, etc.). In such an arrangement, server 1192 is used by computer system 1100 as a service-as-a-platform, and a user interacts with programs running on server 1192 via a web browser or other client application running on computer system 1100. In other arrangements, the facilities for creating dubbed audio-video media productions in accordance with the present invention may be stored locally on and executed by computer system 1100 without need to access server 1192.

As illustrated, computer system 1100 generally includes a communication mechanism such as a bus 1110 for passing information, e.g., data and/or instructions, between various components of the system, including one or more processors 1102 for processing the data and instructions. Processor(s) 1102 perform(s) operations on data as specified by the stored computer programs on computer system 1100, such as stored computer programs for running a web browser and/or for creating dubbed audio-video media productions. The stored computer programs for computer system 1100 and server 1192 may be written in any convenient computer programming language and then compiled into native instructions for the processors resident on the respective machines.

Computer system 1100 also includes a memory 1104, such as a random access memory (RAM) or any other dynamic storage device, coupled to bus 1110. Memory 1104 stores information, including processor-executable instructions, data, and temporary results, for performing the operations described herein. Computer system 1100 also includes a read only memory (ROM) 1106 or any other static storage device coupled to the bus 1110 for storing static information, including processor-executable instructions, that is not changed by the computer system 1100 during its operation. Also coupled to bus 1110 is a non-volatile (persistent) storage device 1108, such as a magnetic disk, optical disk, solid-state drive, or similar device for storing information, including processor-executable instructions, that persists even when the computer system 1100 is turned off. Memory 1104, ROM 1106, and storage device 1108 are examples of a non-transitory "computer-readable medium."

Computer system 1100 also includes human interface elements, such as a keyboard 1112, display 1114, and cursor control device (e.g., a mouse or trackpad) 1116, each of which is coupled to bus 1110. These elements allow a human user to interact with and control the operation of computer system 1100. For example, these human interface elements may be used for controlling a position of a cursor on the display 1114 and issuing commands associated with graphical elements presented thereon. In the illustrated example of computer system 1100, special purpose hardware, such as an application specific integrated circuit (ASIC) 1120, is coupled to bus 1110 and may be configured to perform operations not performed by processor 1102; for example, ASIC 1120 may be a graphics accelerator unit for generating images for display 1114.

To facilitate communication with external devices, computer system 1100 also includes a communications interface 1170 coupled to bus 1110. Communication interface 1170 provides bi-directional communication with remote computer systems such as server 1192 and host 1182 over a wired or wireless network link 1178 that is communicably connected to a local network 1180 and ultimately, through Internet service provider 1184, to Internet 1190. Server 1192 may be configured to be substantially similar to computer system 1100 and is likewise communicably connected to Internet 1190. As indicated, server 1192 may host a process that provides a service in response to information received over the Internet. For example, server 1192 may host some or all of a process that provides a user the ability to create dubbed audio-video media productions, in accordance with embodiments of the present invention. It is contemplated that components of an overall system can be deployed in various configurations within one or more computer systems, e.g., computer system 1100, host 1182 and/or server 1192.

With the above in mind, reference is now made to FIG. 1. Before dubbed audio-video media productions can be created, a database or library of voices is produced. This is accomplished, in one embodiment of the invention, by training a learning engine, e.g., a neural network, to produce sounds from text input according to a desired vocal characteristic. As shown in the illustration, a process 100 involves collecting samples of recorded speech 102, e.g., by recording speakers having a variety of different accents, speakers of different ages and genders, and speakers emulating a variety of emotional characteristics. The recordings may be of individual speakers reading a provided script, or simply recordings of unscripted speeches, conversations, etc., that are later transcribed for training purposes. The recordings may capture the speakers using their respective normal voices, and/or affecting any of a variety of vocal characteristics and/or emotional states, such as those discussed above.

The recorded audio samples along with the text of the script or transcriptions of the recordings are provided as inputs for training the learning engine, 104. As noted above, the training produces a learning engine, 106, that will produce sounds from a text input according to a desired vocal characteristic. Each desired vocal characteristic may be labeled as a character, and collectively the characters will be offered as selectable "voices" for a user seeking to create a dub for an audio-video media production. Accordingly, characters such as "Bob," an American from New York City, and "Hannah," a London-based influencer, may be created from the voice sample inputs and when later selected as voices for use in a dub, text designated to be spoken by Bob and Hannah will be reproduced in voices as one might expect to be characteristic of a male New Yorker or female Londoner, as appropriate. In addition to such human emulations, the trained neural network may produce voices deemed characteristic of non-human actors, such as cyber-people, aliens, animals (if they could speak), and even inanimate objects (e.g., to reflect thoughts of those objects in their own "voices").

Figure 12:
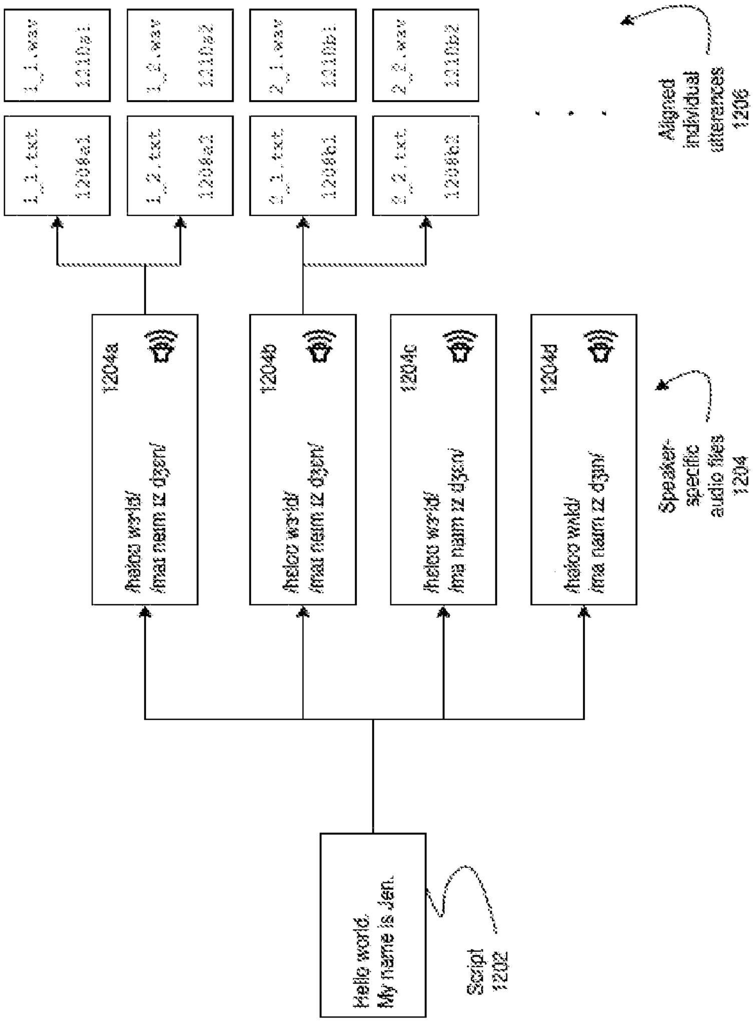
FIG. 12 illustrates an example of a script for which various samples of recorded speech are collected and subsequently disaggregated into aligned utterances, according to an embodiment of the present invention.

FIG. 12 provides an example of a script 1202 for which various samples of recorded speech 1204 are collected. In this example, the script 1202 consists of two lines, "Hello, world." and "My name is Jen." For each of a plurality of speakers, the script is read, and a respective individual audio file 1204*a*-1204*d* is saved as a recording. In the illustration, these speaker-specific audio files 1204 are depicted as phonetic transcriptions of the respective speaker's recoding. Different ones of the speakers can be expected to pronounce the words of the script differently from others of the speakers, hence, the phonetic transcriptions can be expected to differ from one another in various respects. The script and each speaker-specific audio file 1204*a*-1204*d* is then disaggregated to its individual lines and saved as corresponding text (.txt) and audio (.wav) files 1206. We call these aligned individual utterances 1206.

For example, the audio file 1202*a* associated with speaker "a" is disaggregated into two text files, 1_1.txt 1208*a*1 and 1_2.txt, 1208*a*2 one each for each line of the script, and two corresponding audio files, 1_1.wav 1210*a*1 and 1_2.wav 1210*a*2. Similarly, audio file 1202*b* associated with speaker "b" is disaggregated into two text files, 2_1.txt 1208*b*1 and 2_2.txt 1208*b*2, one each for each line of the script, and two corresponding audio files, 2_1.wav 1210*b*1 and 2_2.wav 1210*b*2, and so on for each speaker that records a reading of the script. Note, although .txt and .wav files are being used as examples, the present invention is not limited to the use of such files, and any convenient text and/or audio file formats may be used. Each text file is aligned with its corresponding audio file in terms of its position within the script.

Returning to FIG. 1, the trained learning engine 106 may be configured to apply linguistic and audio effects, as described above. Accordingly, each character can be modified to affect a particular linguistic or diction effect. And, audio or signal effects may be applied to provide characters with desired styles and/or individualities of speech. Learning engine 106 may be deployed at or be accessible by server 1192 and may undergo regular or constant re-training to develop better and more characters and/or linguistic and audio effects over time. For example, one or more instances of the trained learning engine 106 may be provided in a production environment for use by users accessing server 1192, while one or more other instances of the learning engine may be undergoing training or retraining to further develop existing characters and/or new characters. Periodically, e.g., according to a regular schedule, on an ad-hoc basis, or during periods of low utilization, instances of the learning engine in the production environment may be swapped for those that have undergone further or new training, so that the new characters, linguistic and audio effects can be made available to users of the service provided through server 1192.

Figure 13:
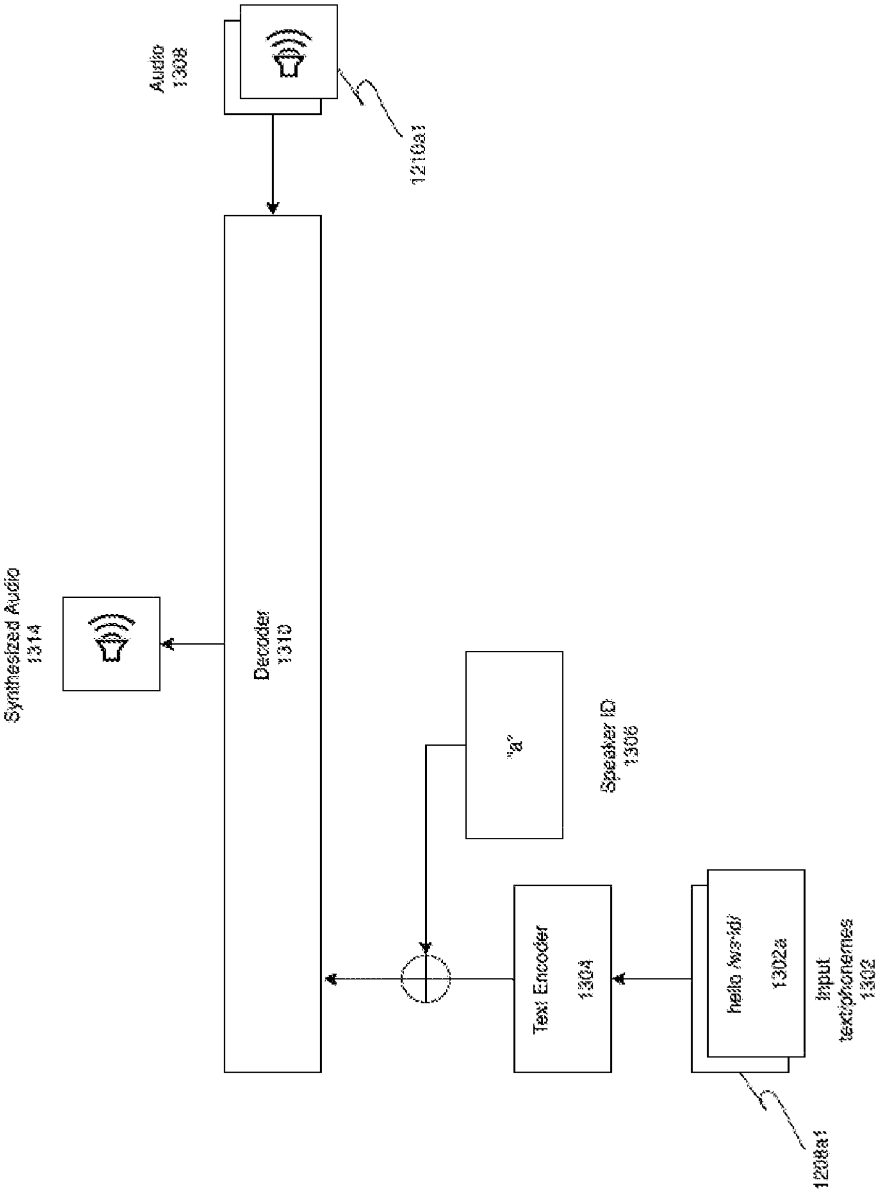
FIG. 13 illustrates an example of how aligned individual utterances produced from recorded speech samples are used as training data for a learning engine according to an embodiment of the present invention.

FIG. 13 illustrates an example of how the aligned individual utterances 1206 are used as training data for the learning engine 106. For each speaker, the utterances 1206 are used as input text and phonemes 1302. By phoneme, we mean a perceptually distinct unit of sound in a specified language that distinguishes words from one another. In the illustrated example, text file **1208*a*1 corresponding to the first line of an utterance from speaker "a" is provided along with a phonetic representation of that line 1302*a* as inputs. These files are encoded 1304 and combined with the identity of the speaker 1036 that produced the associated input. The resulting matrix is provided as an input to a decoder 1310 which also receives the subject speaker's audio utterance 1308 for that line. In this instance, the corresponding audio utterance is 1210*a*1**.

The decoder 1310 correlates the audio sample with the personalized textual and phonetic representation of what is being spoken in the audio sample and, through the process, the learning engine learns how to produce the specified audio from the text for that speaker. The audio produced by the learning engine is referred to as synthesized audio 1314. The synthesized audio produced by the trained learning engine will be the "voice" of the selected character(s) for dubs produced using the timeline editor (or other means) as described further below. When the character "reads" a line of dialog, the character will do so using the voice created or altered by the learning engine (and, optionally, in accordance with any applied filters, etc.). As indicated, in the illustrated embodiment the training makes use of a combination of text in a target language (English in this example) and phonetic transcription of that text, however, in other embodiments text-only or phonetic transcription-only files may be used.

Figure 2:
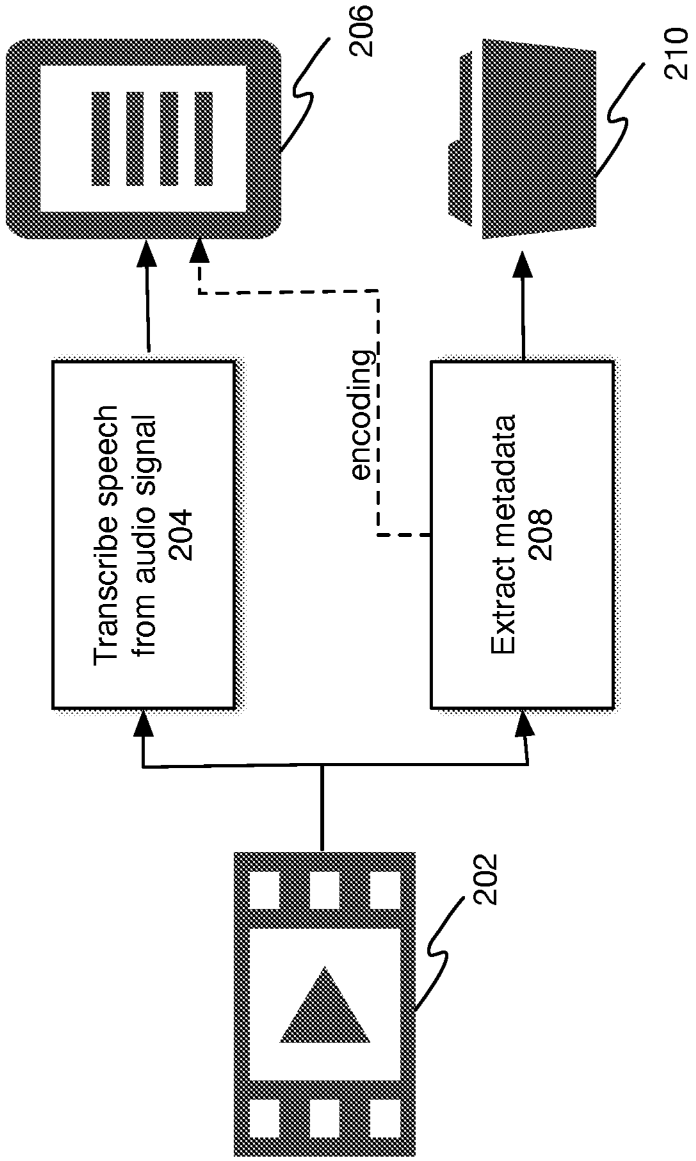
FIG. 2 illustrates an example of automatically transcribing speech, and optionally metadata, from a video clip in accordance with an embodiment of the present invention.

Referring now to FIG. 2, to make use of the trained learning machine to create dubs, an audio-video media production, such as an audio-video clip 202 recorded by a smart phone or other device, is automatically transcribed 204 to extract spoken words from the audio signal. The transcription 206 may be encoded to include information about the time at which the audio data is included relative to the video data, e.g., as extracted from the video clip. In addition, various metadata may be extracted, 208, from audio-video clip 202 and stored, 210. The metadata may include information such as speaker emotional state and/or other information relevant to the scene portrayed in the video clip.

Figure 14:
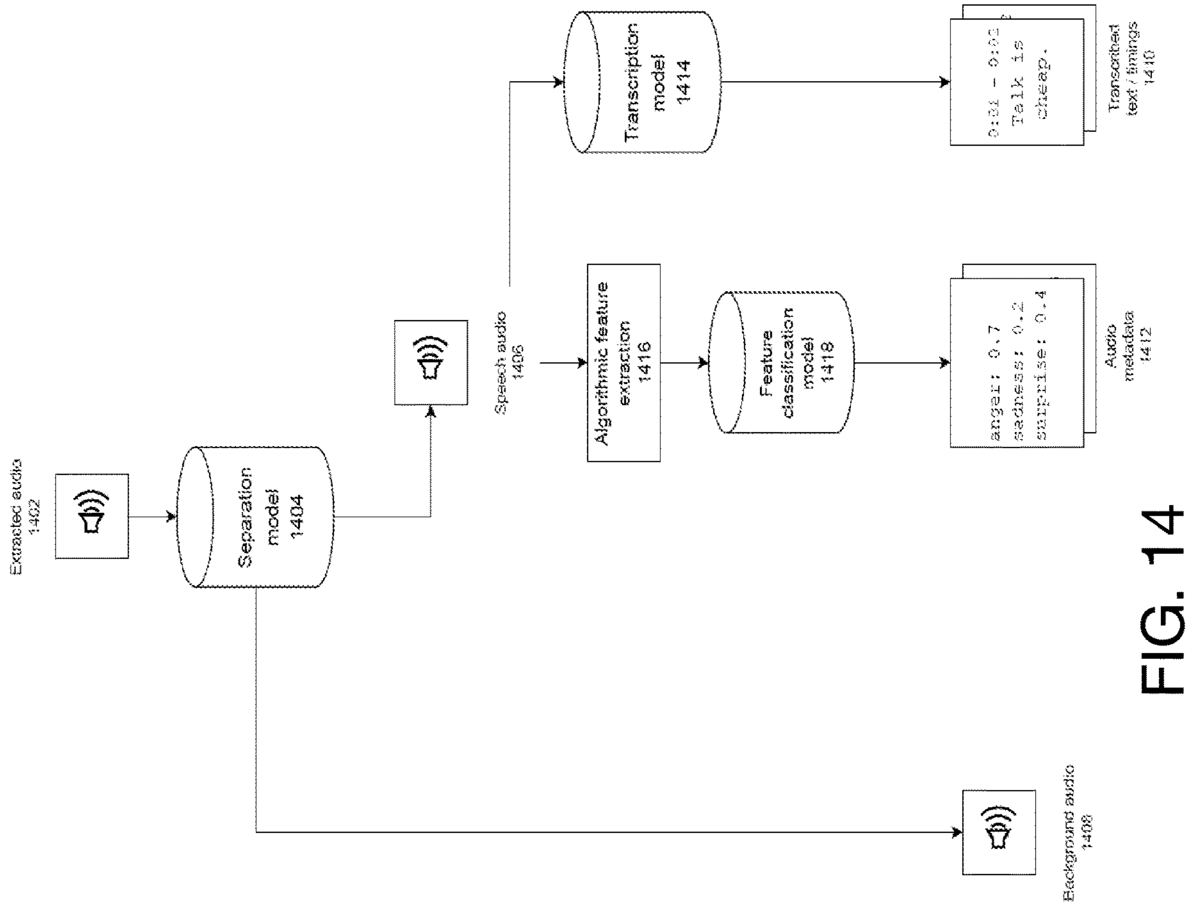
FIG. 14 provides a more detailed example of the process illustrated in FIG. 2.

FIG. 14 provides a more detailed example of the process illustrated in FIG. 2. An extracted audio file 1402 is provided as an input to a separation model 1404. The separation model 1404 separates speech audio 1406 from other audio information in the extracted audio file. We refer to non-speech, segregated audio as "background audio" 1408. Any of several processes may be used to perform this separation. For example, in some implementations separation may be made based on power spectrums of the estimated noise in the audio file. Or, spectral subtraction and a Wiener filter may be employed. More sophisticated techniques for the separation of speech and background audio include convolutional time-domain audio separation as described by Luo, Y. and Mesgarani, N., "Conv-TasNet: Surpassing Ideal Time-frequency Magnitude masking for Speech Separation," IEEE/ACM Trans. On Audio, Speech, and Language Processing, v. 27, no. 8, pp. 1256-1266 (August 2019), and a transformer-based approached as described in Subakan, C. et al., "Attention Is All You Need In Speech Separation," ICASSP 2021-2021 IEEE International Conference on Acoustics, Speech and Signal Processing (ICASSP), Toronto, ON, Canada, 2021, pp. 21-25. Still further methods for such separation are described in U.S. PGPUB 2023/0125170.

Once separated from the background audio, the speech audio 1406 is processed to produce both transcribed text (and, optionally, associated timing encoding) 1410 and metadata 1412. The transcribed text will become the text of the script used in the timeline editor, described below. To obtain the transcribed text, the speech audio 1406 is operated on by a transcription model 1414, which reproduces the speech signals as plain text. In most instances it is useful to encode the text according to a timeline or other timestamp, for example a timeline that begins at the start of the speech audio file or at another identified prompt within that file. The audio metadata 1412 is produced from the speech audio 1406 by first performing feature extraction 1416 followed by feature classification 1418. Feature extraction is done first in order to represent the speech audio by a desired or predetermined number of components in the speech signal. Typically, fewer than all of the possibly included components are chosen so as to reduce the computational burden involved. Feature extraction will provide a multi-dimensional feature vector from the speech audio 1406, which can then be subjected to the feature classification process. The feature classification process 1418 operates on the multi-dimensional feature vector produced by the feature classification process to "score" the desired or predetermined features identified in the speech audio according to their perceived presence. Features may be deemed present or not according to their scores, for example by comparing the score to a threshold value at which the feature is deemed present or not.

Returning to FIG. 2, not all dubs will concern user-recorded video clips. For example, the video clip 202 may be obtained from a library of such clips rather than one recorded by the user making the dub. Or, the video clip may be an animation created as a template for user customization through creation of a dub. Libraries of pre-recorded clips and/or animations may be made available through server 1192 or other facilities. In such cases, rather than extracting an existing audio signal from a media clip, the user may provide a text version of a script for the dub. The script may be one created independently by the user, or it may be a previously produced script that is selected and/or edited and revised by the user. Or, still further, the script may be one associated with the selected clip, which may then be revised by the user according to his/her/their likes.

Figure 3:
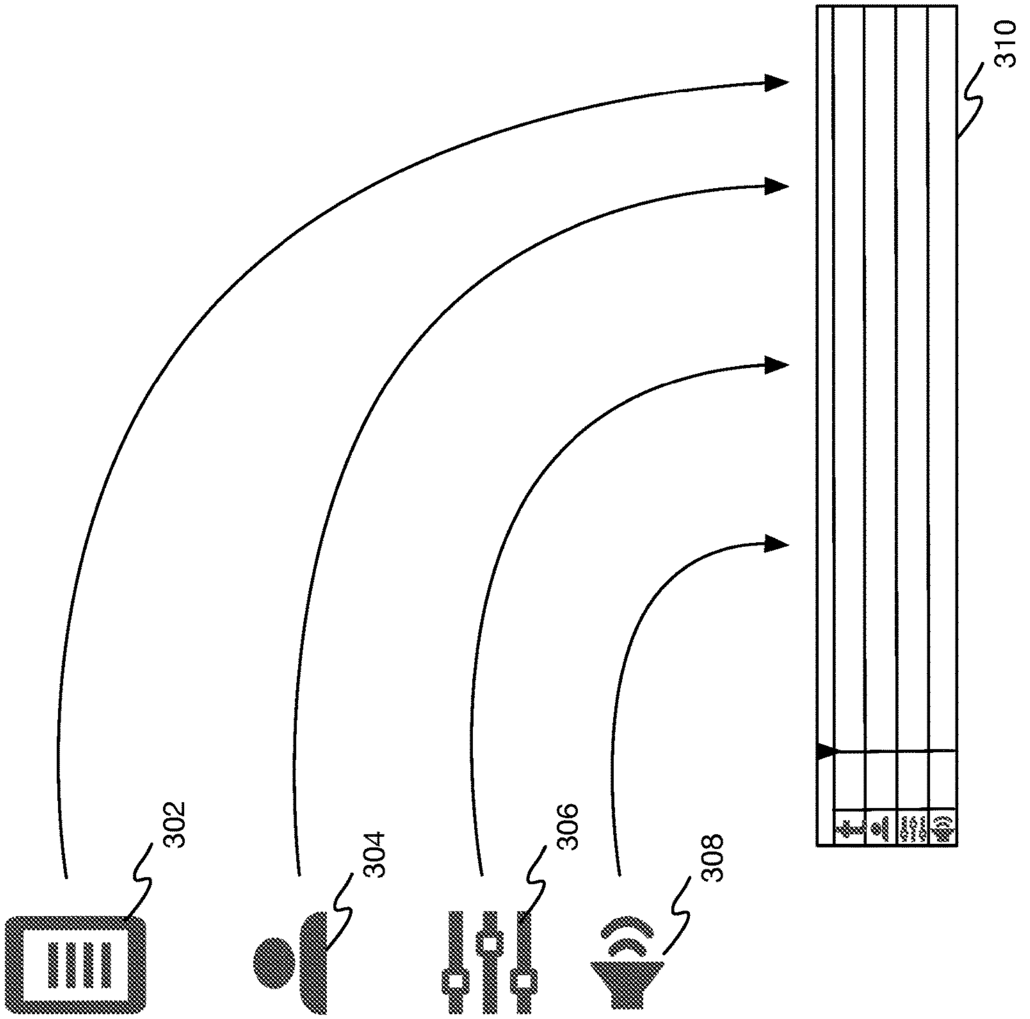
FIG. 3 illustrates an example of incorporating speaker text, speaker profiles, selected filters for linguistic and/or audio effects, and selected sounds in a timeline editor, in accordance with an embodiment of the present invention.

Regardless of how the script is provided, once it is available the user may arrange the passages of the script, e.g., on a per-speaker, per-sentence, and/or other basis, along with selected voiceover profiles and any selected audio and/or linguistic effects, for example using a timeline editor. As shown in FIG. 3, the text of the script 302, speaker profiles 304, selected filters for linguistic and/or audio effects 306, and selected sounds 308 are arranged according to the user's tastes in a timeline editor 310, for example by selecting, dragging, and dropping same into positions along the timeline using a cursor control device such as device 1116. The timeline editor arrangement may be displayed on a display 1114 at a client computer system 1100.

Figure 4:
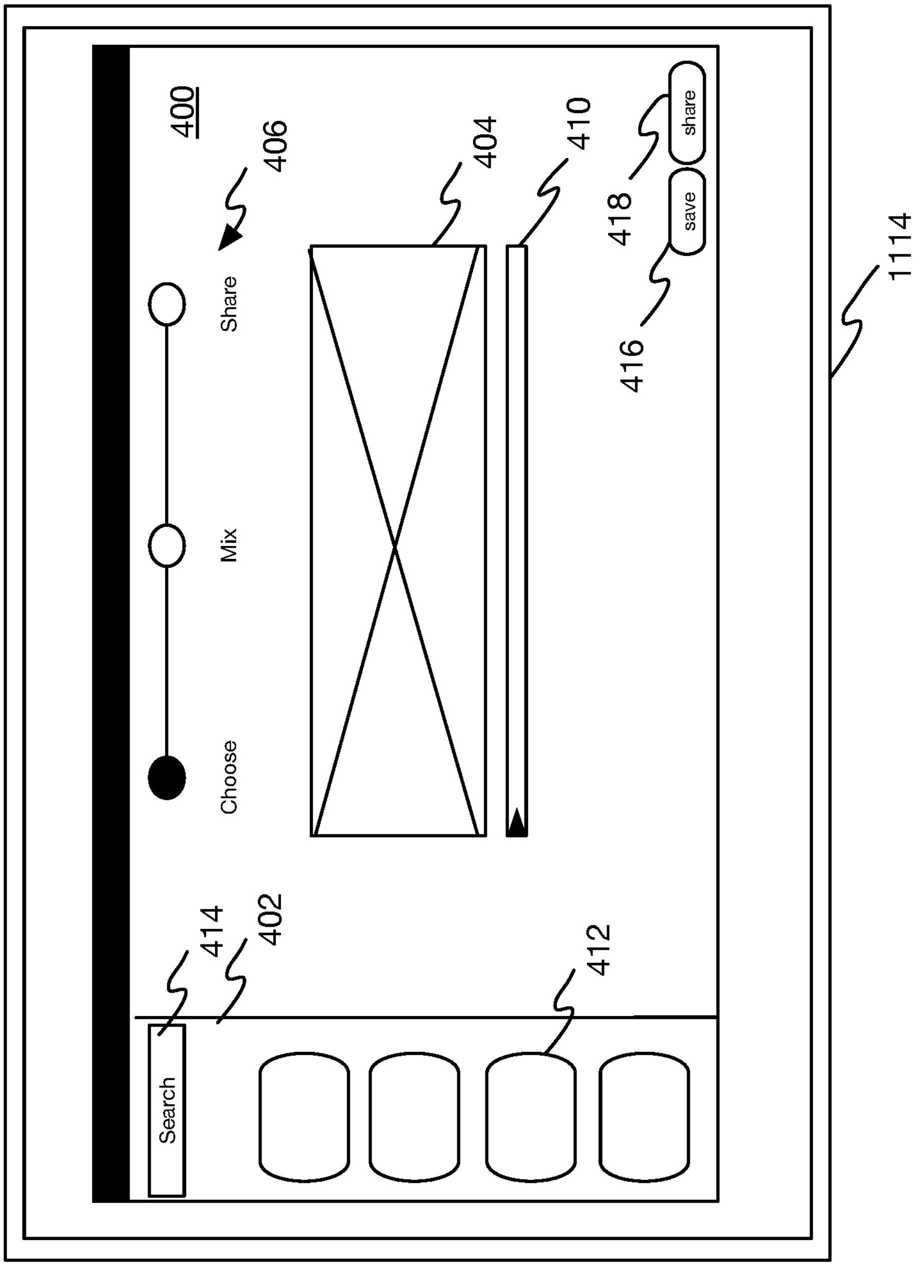
FIGS. 4, 5, 6, and 7 illustrate one example of a timeline editor arrangement such as that shown in FIG. 3 at various time instances during its use, according to an embodiment of the present invention.

FIGS. 4-7 illustrate one example of such a timeline editor arrangement, according to an embodiment of the present invention. Presented on a display 1114 is a graphical user interface 400 that includes a selection area 402 and a viewing area 404. A state indicator 406 arranged within the user interface 400 acts as a visual clue or reminder for the user as to which portion of the audio-video media presentation production process he/she/they are currently undertaking. In FIG. 4, the user is at a step corresponding to choosing a video clip. Various video clips 412 are provided in the selection area 402, and a user can search for, 414, and then select a clip by clicking and dragging it to the viewing area 404. The clips 412 may represent pre-recorded video clips obtained from a library and/or video clips uploaded by the user for dubbing. Once selected, a video clip may be played, paused, cued, reversed, etc., using the media control bar 410. This allows the user to visualize the entire clip, or portions thereof, so as to be able to plan the dialog or other sounds for the dub soundtrack. At various points in the production process, the user may save, 416, and/or share, 418, his/her/their work. For example, the user may elect to share an in-process or completed clip and dub with others by sharing a link to same or by downloading and sharing the entire audio-video media production by email or otherwise.

Figure 5:
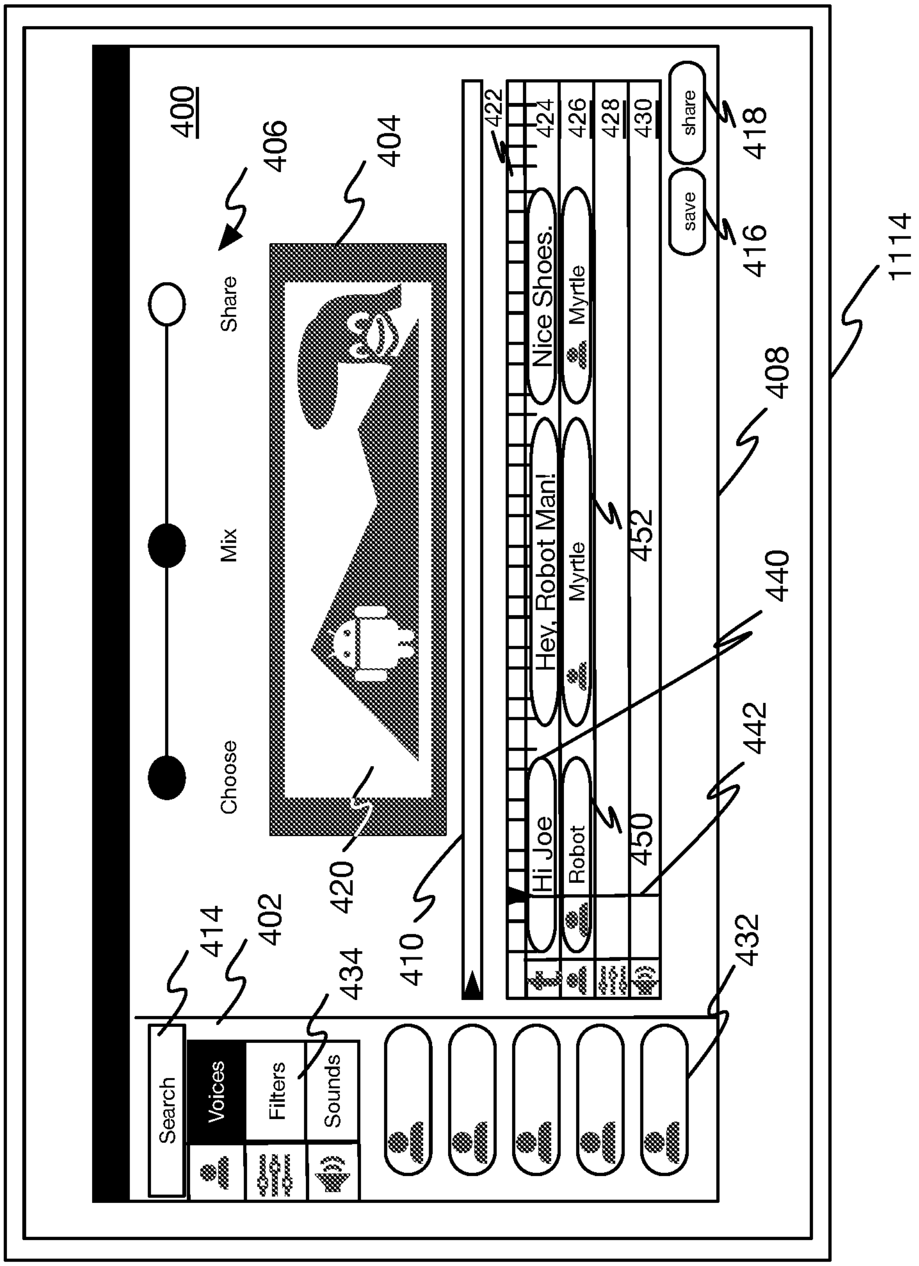

Referring to FIG. 5, once a video clip has been selected and moved to the viewing area 404, the selected clip 420 is displayed in the viewing area, and a timeline editor 408 is provided below it. State indicator 406 is also updated to reflect a "mix" state that reminds the user this is the point of the production process at which the soundtrack dub is created and aligned with frames of the video.

The timeline editor 408 includes a time bar 422 and tracks for the script text 424, characters or voices 426, filters 428, and sounds 430. In one embodiment, if an existing script text is available, either from the selected clip or one previously created by the user, it is automatically imported and displayed in the text track 424. For example, the text of the script may be displayed passage-by-passage or on another basis. The passages and the associated text, or a portion thereof, are provided, in this example in the form of speech bubbles 440 in the text track 424. Using a cursor control device, the user can move the speech bubbles to any desired location within the text track 424 and arrange them in any order. To this end, a timeline indicator 442 is synchronized to the display of frames of clip 420 in the viewing area 404. As the clip plays, the timeline indicator 442 slides horizontally across the timeline editor 408, allowing the user to arrange the speech bubbles as desired with respect to the video frames. This may be done for comedic effect, e.g., by placing the speech bubbles outside of frames in which a user is actually shown speaking, or to achieve a realistic synchronization with actions of the displayed scene in the clip.

The speech bubbles 440 are generally sized according to the duration of the speech represented within them. However, this may be altered by the inclusion of various linguistic or other effects and/or by selection of a character to voice the indicated speech. For example, some characters may be characterized by overly long pauses between words or by rapid speech, etc. In such cases, upon selection of a character with such vocal characteristics, the speech bubbles will be automatically resized within the timeline editor according to the corresponding vocal characteristics of the speaker so that the speech represented by the speech bubble occupies only a corresponding amount of time within the timeline. The timeline may be displayed at various levels of granularity, and in some cases the entire timeline of the clip may not be displayed within a single view of the user interface 400 and instead may be seen to scroll to include only a few seconds or minutes thereof.

A user can assign a character to a speech bubble by selecting the character from the selection area 402 of user interface 400. Shown in FIG. 5 are a number of characters 432 available for such selection. A selection menu 434 allows the user to choose between characters or voices, filters, and sounds. In FIG. 5, the character or voice selection has been made and so a number of available characters 432 are provided for selection. The characters or voices are those developed as outputs of the trained learning engine discussed above. Many different characters may be made available and each will have a characteristic "voice." For example, Bianca, an Italian woman; Carter, an American GI; Emma, an American woman; Evelyn, a British woman with a warm accent; Jamal, an African-American man who speaks quickly; Mia, a fast talking Australian woman; Noah, a French teenager with a baritone voice; and so on. As depicted in the illustration, even non-human characters or voices can be provided, such as "Robot," who may have a somewhat mechanical accent, and Alfie, a cat with a British accent.

When a character 432 is selected, an icon 450, 452 representing the character is provided and can be moved within the character track 426 of the timeline editor 408 so as to correspond to the speech bubble which the character will read in the soundtrack. In this example, a character called "Robot" has been assigned the first bit of the script, "Hello, Joe." Another character, Myrtle, has been assigned the next two lines, "Hey, Robot man!" and "Nice shoes." Although Robot referred to the second participant in the dialog as "Joe," the user has selected the part of Joe to be voiced by Myrtle, an elderly American woman, thus providing some comedic effect to the production. In other embodiments, characters and text bubbles are automatically correlated with one another. So, dragging a character onto the timeline will automatically create a new text bubble. Then, existing text bubbles can be edited by selecting the text bubble and associating a new character with the selected text bubble.

Figure 6:
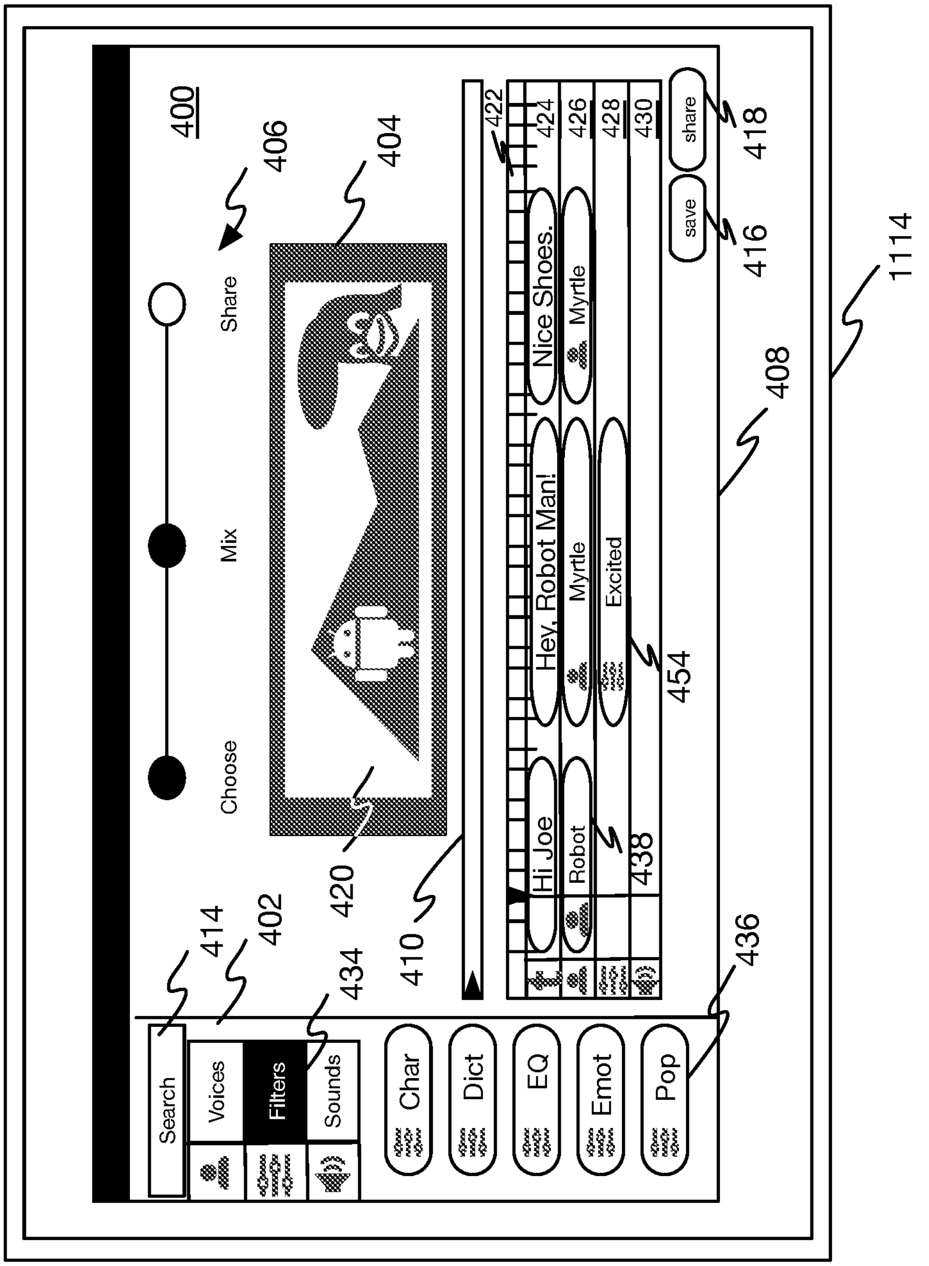

As shown in FIG. 6, because her first line, "Hey, Robot man!" is indicated as being an excited greeting, Myrtle needs to "speak" the line so as to reflect that excitement. Accordingly, the user has selected an "excited" filter 454 from a list of filters 436 in selection area 402. The list of available filters was displayed responsive to the user selecting the filter tab of selection menu 434. With the list of filters so displayed, the user may select any of a variety of available filters and apply them by dragging the selected filter(s) into the filter track 428 of the timeline editor 408. The filter can be made to apply to some or all of the indicated text through appropriate alignment of the filter to the corresponding speech bubble to which it is to be applied. Any of the above-described filters may thus be applied.

In some embodiments, speech, speech bubbles, and text transcription may be applied to spoken, transcribed speech, which may be altered by the system in a fashion similar to that described above for synthesized speech. Stated differently, synthesized audio produced by the trained instance of the learning engine may be applied to pre-recorded utterances in the audio-video media production according to character selections made by the user. From the standpoint of the user, the process would appear similar inasmuch as the same user interface as described above may be used, thus allowing for the same user actions to affect synthetic speech or pre-recorded speech. Thus, modified human speech and synthetic speech may be intermixed together by the user and modified in the same ways (e.g., through changed vocal characteristics) using the same interface.

Figure 7:
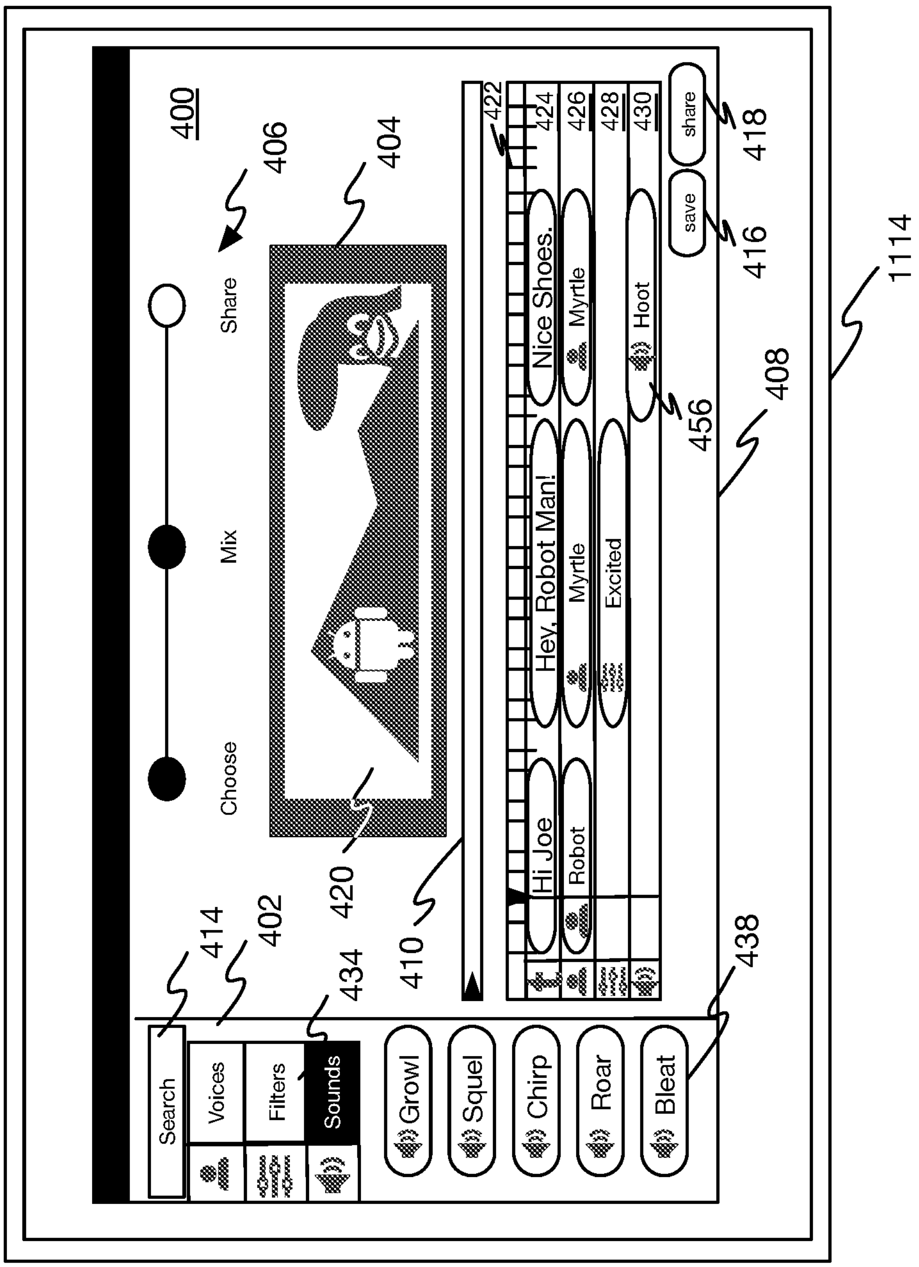

And, now referring to FIG. 7, in addition to applying filters, the user can also add sounds by first displaying a palette of sound options 438 available through selection menu 434 and selecting one of those sound options 456 for inclusion in the sound track 430 of the timeline editor 408. As with the filter selections, the sound selection 456 is added so as to correspond to the speech bubble to which it is to be applied or added and, when so added, the character will speak the lines of the script text such that the selected sound is also included. In the illustrated example, a "hoot" sound is applied to Myrtle's line, "Nice shoes." As discussed above, the library or palette of sounds may reflect a variety of human (or other) sounds in the nature and character of the selected voice and may be produced by the trained learning engine.

By following the above-described procedures, an entire soundtrack can be created for the selected video clip. When the user is satisfied, the clip and soundtrack can be saved and/or shared with others for viewing. When played, the script will be "read" by the selected characters according to the voices of those characters as modified by any applied filters and/or sounds, in synchronization with frames of the video data. In some cases, the text may be presented visually, e.g., as subtitles, in addition to or in lieu of audio signals. The present invention thus provides a user a facility for producing an audio soundtrack for video clips, etc.

Figure 8:
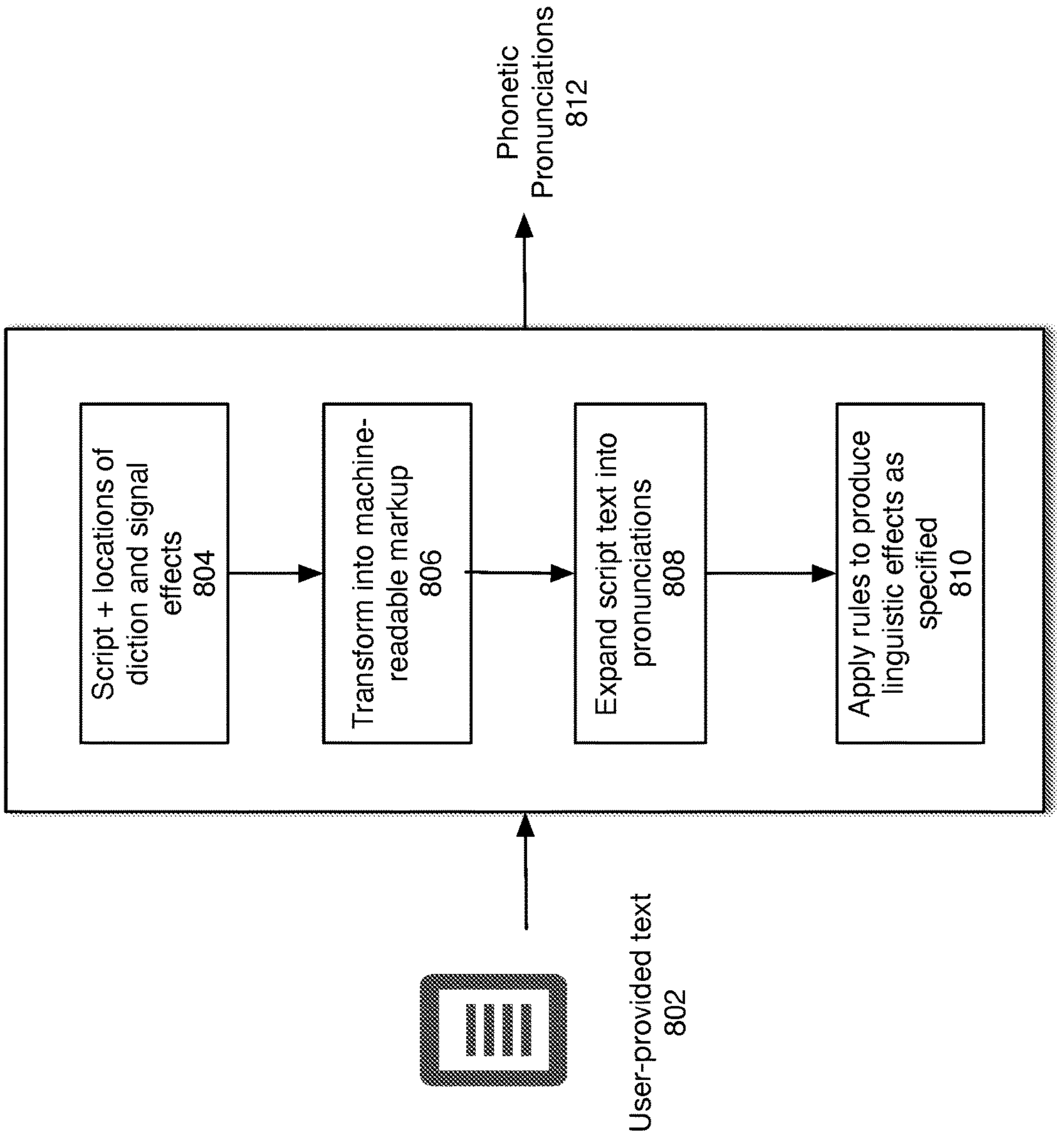
FIG. 8 illustrates an example of converting text of an audio-video media production to a phonetic version thereof and accounting for locations for diction and/or signal effects, according to an embodiment of the present invention.

To provide the desired playback, the text of the audio-video media production is converted to a phonetic version thereof. Generally, this involves altering the script for the subject video clip to produce audio effects according to user-selected attributes for speakers assigned speaking portions of said script. In one embodiment, the script, appropriately annotated, is provided as an input to a text-to-speech synthesis engine, and the text-to-speech synthesis engine produces phonetic sounds that represent the text of the speech according to the selected speaker characteristics. Optionally, these phonetic sounds may be varied according to any user-selected effects. This process is illustrated graphically in FIG. 8.

Beginning with the script 802, the text may be annotated to include locations for diction and/or signal effects of the kind noted above to be applied, 804, and the annotated transcript or script transformed into a machine-readable markup language version thereof, 806. The annotations may account for the filter and sound effects added by the user as part of the timeline editing process. The machine-readable version of the annotated transcript or script may then be used to assign pronunciations according to a rules engine for textual expressions, 808. Again, signal processing effects may be applied to achieve desired characteristics as specified in the timeline edit, 810. In this way, the phonetic version of the transcript or script having the desired characteristics is produced, 812.

Figure 15:
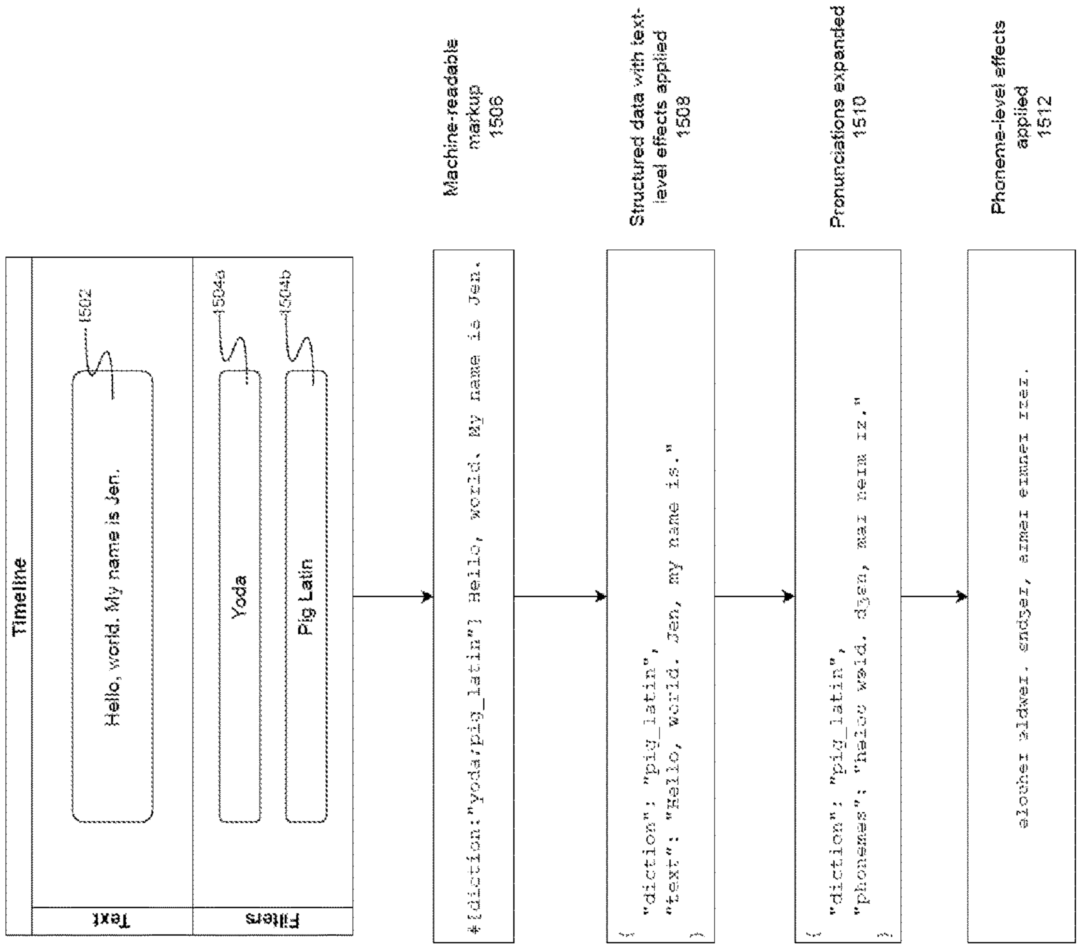
FIG. 15 provides a specific example of the process illustrated in FIG. 8.

FIG. 15 provides a specific example of the above-described process. In this example, script text 1502 reads "Hello, world. My name is Jen." This is a line of the script to be read by a character called Jen, and the user has specified that "Jen" should read the text as "Yoda" in "Pig Latin." Yoda and Pig Latin are, in this example, diction filters **1504*a*, 1504*b*, to be applied to the character voice. In particular, the Yoda filter 1504*a* rearranges the usual subject-verb-object sentence structure as object-subject-verb. The Pig Latin filter 1504*b*** disguises spoken words by transferring the initial consonant or a cluster of consonants to the end of the word and adding a vocalic syllable, typically "ay," to produce a new word.

As indicated above, the original script 1502 is transformed into a machine-readable markup language version thereof, 1506. The markup version specifies the diction filter(s) to be applied to the line of the script, in this case the Yoda and Pig Latin filters. For a given script, not all filters can be applied to all lines. For example, the first sentence of script 1502 reads "Hello, world." This is not a line of text that is written as subject-verb-object. Hence, the Yoda filter is not applied to this line of text. On the other hand, the second sentence "My name is Jen." is written in a form appropriate to application of the Yoda filter and so becomes, "Jen, my name is." Application of the Yoda diction filter is illustrated in the rewritten script structured data 1508. Notice, because the Yoda filter is a filter that is applied at the text level, it causes the text to be rewritten. However, because the Pig Latin filter is one that is applied at the level of phonemes, it is not applied to the text. Other types of filters may be applied, as appropriate, at the level of text or phonemes. In the case of multiple filters applicable at a given level, they are applied in the order selected by the user or, in some instances, according to a hierarchy or other specified order of application created by the system designer. A user may alter a default order of filter application by appropriate ordering of the filters in the timeline editor.

The rewritten text is then expressed as phonemes 1510, and the phoneme-level filtering effects are applied 1512. Thus, the Pig Latin filter is applied to the new phoneme expression " həloʊ wɝld .dʒɛn , maɪ neɪm ɪz." to produce " əloʊheɪ ɝldweɪ ɛndʒeɪ, aɪmeɪ eɪmneɪ ɪzeɪ." This will then be the expression "spoken" by the character Jen when the dubbed video clip is played.

Not shown in FIG. 15 is application of signal processing filters that operate on audio that is already produced. For example, filters that act on synthesized audio. Those filters would be applied after the synthesized audio is produced by the learning engine, for example to provide signal processing effects appropriate to a platform at which the video clip is displayed or other desired effects.

Figure 9:
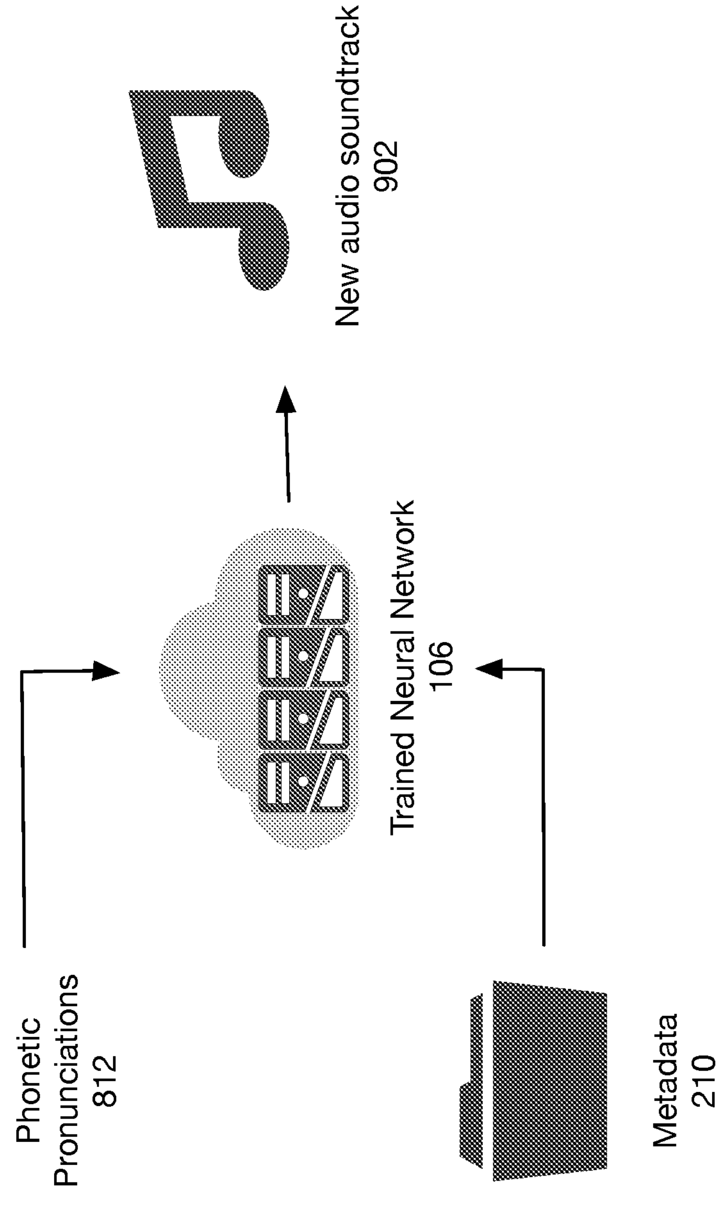
FIG. 9 illustrates the application of a phonetic version of a script, optionally along with extracted metadata, to a trained learning engine to produce a new audio soundtrack having desired vocal and audio signal characteristics, according to an embodiment of the present invention.
Figure 10:
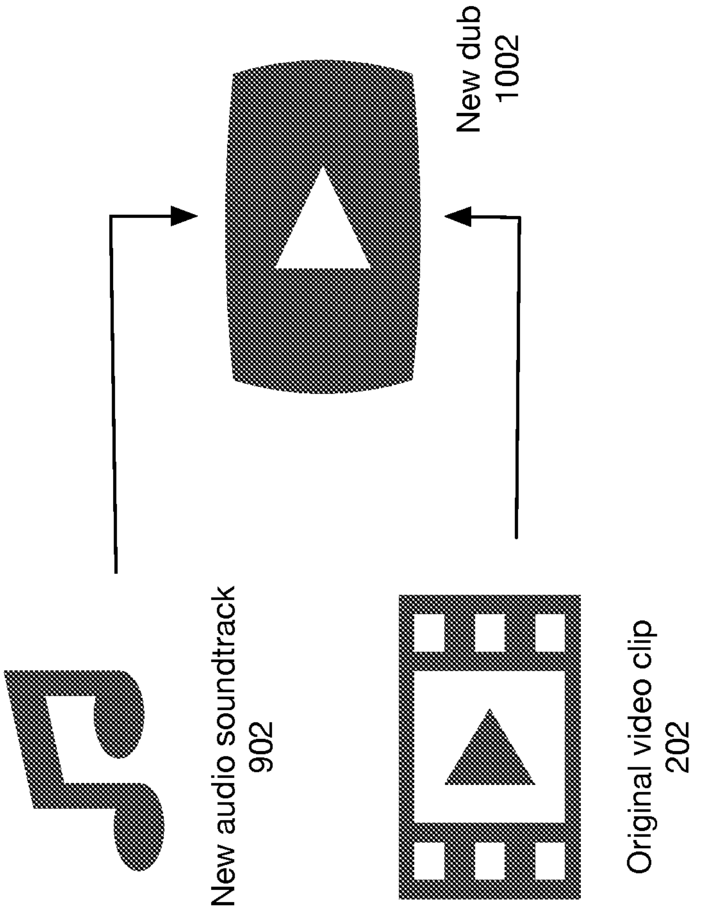
FIG. 10 illustrates the application of a new audio soundtrack as a dub to an original video clip, according to an embodiment of the present invention.

Referring to FIG. 9, the phonetic version of the script, 812, optionally along with the metadata 210 extracted from the audio-video media production, may then be applied as an input to the trained learning engine 106 to produce the new audio soundtrack 902 having the desired vocal and audio signal characteristics selected by the user. Then as shown in FIG. 10, the new audio soundtrack 902 is applied as a dub to the original video clip, 202, for example by playing them in synchronization with one another as specified in the timeline edit produced by the user, as a new dub 1002. Alternatively, where the extracted metadata from an original audio-video media production exists, that metadata may already include timecodes that facilitate the synchronization.

Several customizations of the above-described timeline editor are also possible. For example, in one variant a user may choose to "remix" a dubbed audio-video production by changing the characters (voices) assigned to different roles. A one-click remix option may be provided to allow for such substitution of characters with the new characters being assigned by the system. Some or all of the characters may be replaced in this fashion, or a user may designate individual characters for such substitution. Similarly, user interface elements for gender reversals/modifications, language modifications, or other changes to a dubbed audio-video production may be provided.

Another customization that may be provided is appropriating certain qualities of one character's voice to another character while retaining others of the other character's voice qualities. For example, a given character may have a recognizable cadence to their speech. While retaining that spoken cadence, the character's voice may be substituted with another's to adopt a certain timbre, pitch, intensity, or other quality. A character attribute portion of the timeline interface may allow for customizing individual character profiles in such a fashion. Such voice characterization of synthesized speech may proceed in a fashion similar to that described above for recorded speech, with the synthesized speech being subjected to character assignment and filtering prior to it being played out.

Still another customization allows for rapid previewing of a dubbed audio-video production. For example, during the creation of a dub, a user may wish to review various selection choices to determine if the right character effects are being applied to the production. During editing the character voices and effects may be rendered with reduced quality so that the processing time to produce them is minimized, allowing for this kind of in-process review and revision by the user. When the user is satisfied with a complete dub, the user may then choose to publish the new production at a higher resolution/audio quality, which takes some time to produce before it is ready. The higher quality version may have increased sampling rates and/or audio encoding over those used for the in-process reviewing.

Thus, methods for dubbing audio-video media files and, in particular, such methods as may be used to provide a dubbed audio-video media production using a mixture of synthetically generated and synthetically modified audio content customized according to user-specified traits and characteristics, have been described.

What is claimed is:

1. A computer-implemented method for generating a dubbed audio-video presentation, the method comprising:

(a) accessing a learning engine trained to produce synthesized audio based on audio samples representing different speaker vocal characteristics;

(b) transforming at least a portion of a script for an audio-video production into a phonetic representation;

(c) producing, from the phonetic representation, at least one dubbed audio track using the learning engine, wherein the learning engine receives the phonetic representation as input and generates the at least one dubbed audio track based on the phonetic representation;

(d) synchronizing the at least one dubbed audio track with frames of the audio-video production to create the dubbed audio-video presentation; and (e) providing a timeline editor that displays segments of the script, the timeline editor being configured to receive a user-specified prompt associated with a particular segment of the script, the user-specified prompt instructing an application of at least one of a vocal characteristic, a comedic effect, or a pacing to the particular segment, and to assign a speaker profile corresponding to a desired vocal characteristic to each displayed segment of the script.

2. The method of claim 1, further comprising applying a linguistic or audio effect to the phonetic representation, wherein the effect comprises at least one of:

(a) modifying word order to achieve a style of speech;

(b) altering pitch or pacing; or (c) changing accent or prosody.

3. The method of claim 2, further comprising receiving metadata from an existing audio-video file, wherein the metadata indicates at least one of speaker emotion or scene mood, and using the metadata to select the linguistic or audio effect applied in step (d) of claim 1.

4. The method of claim 3, wherein the timeline editor of claim 1 enables a user to:

(a) assign a speaker profile corresponding to a desired vocal characteristic for each segment of the script;

(b) preview the synthesized audio in synchronization with frames of the audio-video production; and (c) adjust the speaker profile or the linguistic or audio effect of the dubbed audio track.

5. The method of claim 4, further comprising extracting an existing soundtrack from the audio-video production and separating speech components from background audio to produce a text transcription, wherein the text transcription is used as part of the script for generating the dubbed audio-video presentation.

6. The method of claim 5, further comprising accessing, in the timeline editor, a stored selection of emotional or style of speech to apply to the text transcription, and generating synthesized audio that reflects tone and voice.

7. The method of claim 6, further comprising outputting the dubbed audio-video presentation in at least one rendering format for sharing via a media or social platform.

8. The method of claim 1, further comprising providing at least one user-selectable sharing option that publishes the dubbed audio-video presentation to one or more platforms.

9. The method of claim 1, further comprising storing the dubbed audio-video presentation on a network-accessible server, thereby allowing the dubbed audio-video presentation to be assessed or edited later by a user.

10. The method of claim 1, further comprising converting the dubbed audio-video presentation into multiple rendering formats, each format adapted for a different publication channel or playback.

11. The method of claim 1, further comprising analyzing metadata extracted from the audio-video production, wherein the metadata includes at least one of speaker emotion, facial expression, mood indicators, and automatically applying an audio or linguistic transformation corresponding to the metadata.

12. The method of claim 1, further comprising generating a preview of the dubbed audio track during editing, enabling a user to playback of any applied speaker profiles or filters before presentation.

13. The method of claim 1, further comprising hosting at least part of the method as a remote service, wherein users interact with a web-based or network-accessible interface to edit, generate, or store the dubbed audio-video presentation.

14. The method of claim 1, wherein the user-specified prompt associated with the particular segment of the script comprises one or more additional prompts directed to a second segment of the script different from the particular segment.

15. The method of claim 1, further comprising encoding the dubbed audio-video presentation into a file format for sharing via a media or social platform.

16. The method of claim 1, wherein the timeline editor is configured to receive, with respect to a single segment of the script, a plurality of user-specified prompts that are applied in combination to the single segment, the plurality of user-specified prompts comprising at least two of (i) a prompt instructing application of a vocal characteristic, (ii) a prompt instructing application of a comedic effect, and (iii) a prompt instructing application of a pacing, and wherein the dubbed audio track for the single segment is generated by the learning engine based on the phonetic representation of the single segment with the plurality of user-specified prompts applied in combination.

17. A system for generating a dubbed audio-video presentation, the system comprising:

one or more processors; and a memory storing instructions that, when executed by the one or more processors, cause the system to:

(a) access a learning engine trained to produce synthesized audio based on audio samples representing different speaker vocal characteristics;

(b) transform at least a portion of a script for an audio-video production into a phonetic representation;

(c) produce, from the phonetic representation, at least one dubbed audio track using the learning engine, wherein the learning engine receives the phonetic representation as input and generates the at least one dubbed audio track based on the phonetic representation;

(d) synchronize the at least one dubbed audio track with frames of the audio-video production to create the dubbed audio-video presentation; and (e) provide a timeline editor that displays segments of the script, the timeline editor being configured to receive a user-specified prompt associated with a particular segment of the script, the user-specified prompt instructing an application of at least one of a vocal characteristic, a comedic effect, or a pacing to the particular segment, and to assign a speaker profile corresponding to a desired vocal characteristic to each displayed segment of the script.

18. The system of claim 17, wherein the memory further stores instructions that, when executed by the one or more processors, cause the system to:

provide a timeline editor configured to display segments of the script and allow a user to:

(i) assign a speaker profile corresponding to a desired vocal characteristic to each segment;

(ii) preview the synthesized audio in synchronization with the audio-video production; and (iii) apply at least one user-selectable linguistic or audio effect indicative of a tone and voice of the dubbed audio track.

19. A non-transitory computer-readable medium storing instructions that, when executed by one or more processors, cause the one or more processors to:

(a) access a learning engine that is trained to produce synthesized audio based on audio samples representing different speaker vocal characteristics;

(b) convert at least a portion of a script for an audio-video production into a phonetic representation;

(c) generate, from the phonetic representation, at least one dubbed audio track using the learning engine, wherein the learning engine receives the phonetic representation as input and generates the at least one dubbed audio track based on the phonetic representation;

(d) synchronize the at least one dubbed audio track with frames of the audio-video production to form a dubbed audio-video presentation; and (e) provide a timeline editor that displays segments of the script, the timeline editor being configured to receive a user-specified prompt associated with a particular segment of the script, the user-specified prompt instructing an application of at least one of a vocal characteristic, a comedic effect, or a pacing to the particular segment, and to assign a speaker profile corresponding to a desired vocal characteristic to each displayed segment of the script.

20. The non-transitory computer-readable medium of claim 19, wherein the instructions, when executed, further cause the one or more processors to:

analyze metadata extracted from an existing audio-video file, wherein the metadata indicates at least one of speaker emotion or scene mood;

apply at least one linguistic or audio effect based on the metadata;

generate a preview of any applied speaker profile; and output the dubbed audio-video presentation in a format for sharing via a media or social platform.

* * * * *